United States Patent Office 3,317,379
Patented May 2, 1967

3,317,379
METHODS OF TREATING BLOAT IN RUMINANTS
Robert T. McCarty, Fort Worth, Tex., assignor to Geigy Chemical Corporation, Ardsley, N.Y., a corporation of Delaware
No Drawing. Filed June 24, 1963, Ser. No. 290,241
8 Claims. (Cl. 167—53)

This invention relates to the reduction of the incidence and severity of bloat in a ruminant animal.

In a major aspect, the invention is that of a method of reducing the incidence and severity of bloat in such animal by having it take a sufficient quantity, effective significantly to reduce the incidence and severity of bloat in such animal, (a) of ethylenediamine di(ortho-hydroxy phenylacetic acid) or of its corresponding monoamide, which acid or monoamide may be substituted as shown below on either or both of its ethylene carbons and/or on any of the carbons of its benzene rings; or (b) of an alkali metal or ammonia-derived salt or an acid addition salt of any such acid or monoamide, so long as any such salt is pharmaceutically acceptable in the dosage regimen in which it is to be administered.

Any of the foregoing substances, being effective to reduce the incidence and severity of bloat in a ruminant animal, is referred to briefly as a "bloat-reducing substance."

Bloat is not a new disease among ruminant animals. However, due to the increase in raising of such animals in recent years in high producing legume pastures, it has become a very serious problem, and especially also because of the increased numbers of such livestock. It has been estimated that in the United States of America annual losses due to bloat in the production of sheep and cattle approach fifty million dollars. Such losses include, for example, animal deaths provoked by the ailment, not to stress the need for surgery and other treatments to avoid such outcome.

An important feature of the various aspects of the invention is the substantially significant decrease in the incidence and severity of bloat in the ruminant animal and the resultant avoidance of death and also need for surgery or other special treatment.

Considered broadly, the invention involves reducing the incidence and severity of bloat in a ruminant animal by subjecting it to an intake of from about 0.018 to about 0.045 gram per day per kilogram of body weight of a bloat incidence and severity reducing substance having the formula

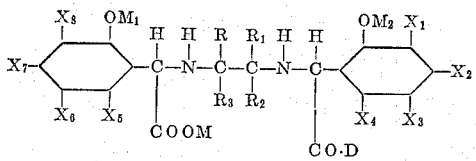

or an acid addition salt thereof, wherein any of R through $R_3$ separately is hydrogen, an alkyl group having 13 carbon atoms, a hydroxy(lower)alkyl group, or alternatively a divalent lower polyalkylene group having under 5 carbon atoms substituted for either pair of R and $R_1$ or $R_2$ and $R_3$; and any of $X_1$ through $X_8$ is hydrogen or an alkyl group with one through ten carbon atoms, a lower alkoxy, lower hydroxyalkyl, carboxyl, alkali cation carboxylate, hydroxyl, alkali metal-oxy group, or the nitro, free amino (i.e., the unsubstituted amino), cyano, sulfo, alkali metal sulfonate group, or a halogen; D is the free amino or hydroxyl group or the group —OM; and M is hydrogen or an alkali cation; and any of $M_1$ and $M_2$ is hydrogen or an alkali metal.

Any alkali cation in any of these substances having the herein just above described formula, or acid addition salt of such substances, is either an alkali metal cation or an ammonia-derived cation such that the substance as a whole is pharmaceutically acceptable at the dosage regimen followed to provide the ruminant animal with an intake of from about 18 to about 45 milligrams of the substance per day per kilogram of body weight of the animal.

The foregoing various applicable bloat-reducing substances are described more fully in U.S. Patents Nos. 3,005,848 and 3,028,407. Any such applicable substance which is a carboxylate, sulfonate and/or phenolate form of any of the embraced free acid substances or an acid addition salt of any of them, is a specific such salt as is pharmaceutically acceptable to such ruminant at the dosage regimen followed to provide it with the indicated dosage intake of the substance to provide reduction in the incidence and severity of bloat.

As presently indicated, a bloat-reducing substance applicable in the invention can be given to a ruminant animal prone to bloat, say, in a range from about 0.018 to about 0.045 gram per day per kilogram of body weight of the ruminant, or generally at about 0.032 gram per day per kilogram of body weight. Thus, for example, for a lamb of about 32 kilograms body weight, there can be administered 0.75 gram to about 1.75 grams, or generally about 1.25 grams, of the employed bloat-reducing substance.

As to the method of the invention, it may be practiced by orally administering any of the herein provided applicable bloat-reducing substances, for example, directly by mouth as a drench given, say, by a dosing syringe, or by incorporation in dry feed ration or in the drinking water (as by solution in it); in accordance with whichever procedure is indicated by the specific condition of the ruminant animal.

For example, as a preventative measure to lower the possibility of incidence of bloat or to reduce its severity in the event that it nevertheless may occur, the bloat-reducing substance can be incorporated in the dry feed supplement or dissolved in the drinking water when the animals otherwise ordinarily graze in pastures bearing grazing vegetation generally known to provoke bloat distress, such as alfalfa, Ladino clover, and other high producing legume pastures.

Otherwise, in cases where the ruminants have been grazing on alfalfa or other high producing legumes but without receiving any of the bloat-reducing substances in drinking water or dry feed supplement, and the occurrence of bloat is being observed, although not yet in the severe stage, such animals alone may be handled to be given drinking water and/or dry feed supplement containing a bloat-reducing substance if it is not desired yet to place the entire flock on such drinking water and/or dry feed supplement containing a selected bloat incidence and severity reducing substance. In such cases, it may be advisable then to place the entire flock on such water and/or dry feed supplement.

However, any of the animals who manifest intense bloat distress so that the risk of death or need for surgery or other special treatment is too great, should be given the specific bloat-reducing substance by the drenching route. Each such ruminant animal should be given, say, by dosing syringe a sufficient daily requirement, within the disclosed range, of a herein described bloat-reducing substance dispersed in water.

For example, an aqueous solution of ethylenediamine di(ortho-hydroxyphenylacetic acid) or its disodium salt can be prepared in suitable concentration to enable giving, say, a lamb of about 32 kilos weight, by dosing syringe a single daily dose of 1.25 gram of that free acid or its disodium salt until the condition is relieved sufficiently to allow reliance solely on an animal's receiving an adequate intake of the bloat-reducing substance by way of its drinking water and/or dry feed supplement.

For use by intake with the drinking water, the bloat-reducing substance can be dispersed (e.g., dissolved) in it in such a concentration that the ruminant can consume daily in the quantity of water ordinarily daily consumed by it, the amount of the bloat-reducing substance intended for the animal to take by this route.

A suitable dry feed supplement containing a bloat-reducing substance included in the invention, can be prepared, for example, by admixing from about 30 to 90 parts of hay or silage (for roughage), about 10 to 50 parts of grain, and about 2 to about 20 parts of a suitable customary concentrated protein (with or without adding a suitable quantity of urea as non-protein nitrogen source), and substantially uniformly incorporating therein from about one-half pound to about one and one-half or one and three-quarters pounds of the bloat-reducing substance, such as ethylenediamine di(ortho-hydroxyphenylacetic acid) or advantageously a water-soluble salt of it such as its disodium salt or an ammonium salt of it such as its di-ammonium salt.

The selected bloat-reducing substance can be incorporated thus either in the form of a finely divided dry powder or a suitable aqueous dispersion or solution of any of the more readily water-soluble such substance in a suitable concentration influenced by the particularly desired final condition for this bloat-reducing substance-containing feed supplement.

Another suitable dry feed supplement can be prepared by substantially uniformly admixing 150 pounds of soybean oil meal, 100 pounds of dry feeding molasses, and 55 ounces of ethylenediamine disodium di(ortho-hydroxyphenylacetate).

The effectiveness in reducing incidence of bloat in a ruminant animal by administration of a bloat-reducing substance as embraced in the invention is illustrated by results, for example, initially obtained by such use on lambs weighing, say, from 70 to 90 pounds. Their bloating pattern resulting from grazing on alfalfa was observed and subjectively evaluated for degree of bloat on a scale of from 0 (i.e., zero) to 5 as described by R. H. Johnson et al. in "Journal of Animal Science" (1958) volume 17, pages 893 et seq.

Their bloat scoring scale applied in evaluating presence of bloat and its severity is:

| Score | Observation | Description of Observation |
|---|---|---|
| 0 | No bloat | No distension on left side. |
| 1 | Slight | "Puffy" distension on left side. |
| 2 | Mild | Marked distension on left side, slight distension on right side. |
| 3 | Moderate | Extreme distension on both sides; drumlike, minor distress symptoms. |
| 4 | Severe | Extreme distension on both sides; discomfort, difficult breathing, excessive urination, etc. |
| 5 | Terminal | Extreme abdominal distension; severe distress, down, dies unless treated. |

The animals with the highest total bloat were divided into equal groups on the basis of their thus indicated bloat potential. Before letting the lambs out in the morning for grazing in their selected pasture plots, each lamb of a group that was to receive a bloat-reducing substance was separately given by drench the same specific dosage of ethylenediamine di(ortho-hydroxyphenylacetic acid), herein after briefly called EDDHA, or of its disodium salt (which later hereinafter is briefly called Na$_2$EDDHA), according to which was being tested against a control group of lambs who received no such substance.

All the lambs were grazed for the same period of time, approximately an hour to an hour and a half (depending on the severity of bloat occurring during the specific day) in the forenoon and likewise in the afternoon. Each of the lambs in each group was separately scored in the morning and again the afternoon. The bloat index (i.e. the sum of the maximum bloat scores of the animals divided by the number of lamb observations, i.e. the total of all of the scoring observations made on all of the lambs that were checked as to bloat score per bloat-reducing substance level treatment) then was determined at different levels.

Each treated group of lambs was compared with an equivalent group of control, i.e., non-treated, lambs, but both groups were similarly grazed and observed. In one comparison, the control group showed a bloat index of 1.53 while the group in which the lambs were treated in the morning before grazing, with 1.25 grams each of EDDHA showed a much lower bloat index of 1.23.

In another comparison wherein one group received by drench 0.75 gram of EDDHA, a second group received 1.25 grams EDDHA per lamb, and the third group serving as controls had received none, the bloat index of the control group was 1.53 while that of the group receiving 0.75 gram EDDHA per lamb showed a bloat index reduced to 1.39, and the group which received 1.25 grams EDDHA showed a still further reduced bloat index of 1.26; respectively on a total of 242 observations made on each of the three groups separately.

In the third comparison wherein one group received 1.25 grams EDDHA per lamb the bloat index was much reduced to 1.32 and in the group which received 1.75 grams EDDHA per lamb the bloat index was reduced somewhat further to 1.28, whereas the control group showed a much higher bloat level of 1.46; on a total of 220 observations made on each group respectively.

In a fourth comparison the control group showed a bloat index of 1.10 whereas a group which received by drench 1.25 grams of Na$_2$EDDHA per lamb showed a considerably lower bloat index of 0.54, and a third group which received the same substance at the same level per lamb by feeding on a dry feed supplement composed as described in column 3, lines 34–38, showed a comparable bloat index of 0.60; on a total of 80 observations on each of the groups.

These two separate comparisons show that administration of the bloat-reducing substance by either the drenching or feeding route reduced bloat severity to a similar degree; in other words, when administered to the ruminant animal as a prophylatic measure either by drench or by self-administration as in feeding with a dry feed supplement containing the substance admixed in it. Similar results are obtainable by self-administration when the ruminant takes a similar dosage of the bloat-reducing agent dispersed in its drinking water, e.g., in solution in it.

The bloat-reducing substances applicable according to the invention can be used within the range disclosed hereinabove. EDDHA consumed at the levels of from 0.75 gram to 1.75 grams per lamb over a continuous period did not appear to depress the lamb's appetite. These substances likewise can be effective in reducing bloat distress and danger when administered in remedial therapy to treat a ruminant suffering from bloat distress in the absence of having received as a prophylactic measure any bloat-reducing substance embraced within the invention. About 1.25 grams daily per lamb of about 32 to 35 kilos appears to be a suitable average level for use either prophylactically or as a remedy therapy.

While the invention has been explained by a particularized description of it involving inclusion of EDDHA alone as well as in the form of a pharmaceutically acceptable alkali metal salt of it, namely, its disodium salt, either of them can be replaced by a like amount of any other pharmaceutically acceptable alkali salt of EDDHA as well as of any other salt of it having another pharmaceutically acceptable alkali cation such as an ammonia-derived cation as an ammonium salt of EDDHA, e.g., is di-ammonium salt.

EDDHA or any of its just mentioned salts also can be replaced by a pharmaceutically acceptable acid addition salt of it or any of its alkali cation salts, as well as by the corresponding monoamide wherein the carboxyl group of one of the phenylacetic acid groupings is replaced by the carbamido group (i.e., —CONH$_2$). Such latter substance can be referred to as the free acid-monoamide.

Thus, also in such method and any such dry feed supplement, any such bloat-reducing free acid, or carboxylate salt, or acid addition salt of either thereof, likewise can be replaced by the corresponding free acid or free acid-monoamide or acid addition salt or carboxylate salt of the latter, in any of which the benzene rings are further substituted as hereinabove disclosed or any of the hydrogens on either or both of the ethylene carbons is replaced as hereinabove mentioned.

Accordingly, each of the foregoing illustrative dry feed supplements as well as each of the foregoing specific treatments employing the method of the invention with either varying quantities of either EDDHA or Na$_2$EDDHA is to be considered as similarly beneficially useful and repeated with its specific bloat-reducing substance replaced by each of the applicable others respectively, for example, di-ammonium EDDHA, as if each such separate composition or process originally was recited in full with any such other bloat-reducing substance embraced within the scope of the structural formula shown and described hereinabove.

What is claimed is:

1. The method of reducing the incidence and severity of bloat in a ruminant animal, which comprises providing the animal by oral administration with an intake of from about eighteen to about forty-five milligrams per day per kilogram of body weight of a bloat incidence and severity reducing substance which is a member of the class consisting of (a) an ethylenediamine derivative having the formula

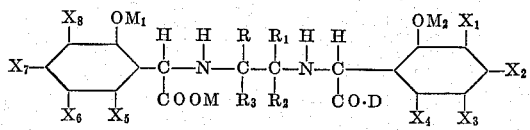

wherein any of R through R$_3$ is separately a member of the class consisting of hydrogen, alkyl having under 13 carbon atoms, hydroxy lower alkyl, and the divalent polyalkylene group having under 5 carbon atoms substituted for one of the pairs of R and R$_1$ or R$_2$ and R$_3$; and any of X$_1$ through X$_8$ is separately a member of the class consisting of hydrogen, alkyl with one through ten carbon atoms, lower alkoxy, lower hydroxyalkyl, carboxyl, alkali carboxylate, hydroxyl, alkali metal-oxy, nitro, free amino, cyano, sulfo, alkali metal sulfonate, and halogen; D is a member of the class consisting of free amino, hydroxyl, and —OM; and M is selected from the class consisting of hydrogen and an alkali cation; and each of M$_1$ and M$_2$ is independently selected from the group consisting of hydrogen and alkali metal; and (b) an acid addition salt of the member (a), which addition salt is pharmaceutically acceptable at the dosage regimen followed to provide said intake of said substance;

and the alkali cation in members (a) and (b) is a member of the class consisting of (i) alkali metal, and (ii) an ammonia-derived cation which leaves said specific bloat incidence and severity reducing substance as a whole pharmaceutically acceptable at the dosage regimen followed to provide said intake.

2. The method as claimed in claim 1, wherein the ethylenediamine derivative is ethylene bis(alpha-imino-ortho-hydroxyphenylacetic acid).

3. The method as claimed in claim 1, wherein the ethylenediamine derivative is an alkali metal ethylene bis(alpha-imino-ortho-hydroxyphenylacetate).

4. The method as claimed in claim 1, wherein the ethylenediamine derivative is disodium ethylene bis (alpha-imino-ortho-hydroxyphenylacetate).

5. The method as claimed in claim 1, wherein the intake of the bloat incidence and severity reducing substance is about thirty-two milligrams per day per kilogram of body weight.

6. The method as claimed in claim 1, wherein the ruminant animal is provided with said intake of said bloat incidence and severity reducing substance by incorporating it in a dry ration feed which is used as supplement to what said animal would consume by grazing, and in a sufficient concentration in said dry ration feed whereby the ruminant, by consuming the quantity of such dry ration which it customarily consumes per day, obtains an effective dose of substance.

7. The method as claimed in claim 1, wherein the ruminant animal is provided with said intake of said bloat incidence and severity reducing substance by dispersing it in the drinking water provided for said ruminant and in a sufficient concentration in said water whereby said ruminant, by consuming said substance-containing drinking water in the same quantity as that of drinking water which is customarily consumes daily, obtains an effective dosage of bloat reducing substance.

8. The method as claimed in claim 1, wherein said bloat incidence and severity reducing substance is administered to the ruminant animal as a drench from a customary drenching-administration means inserted into the animal's mouth.

No references cited.

SAM ROSEN, *Primary Examiner.*

FRANK CACCIAPAGLIA, JR., JULIAN S. LEVITT,
*Examiners.*

UNITED STATES PATENT OFFICE
CERTIFICATE OF CORRECTION

Patent No. 3,317,379　　　　　　　　　Dated May 2, 1967

Inventor(s)　　Robert T. McCarty

It is certified that error appears in the above-identified patent and that said Letters Patent are hereby corrected as shown below:

Column 1, line 59, after "having" insert -- under --. Column 3, line 70, "later" should read -- latter --. Column 4, line 3, after "again" insert -- in --.

Signed and sealed this 7th day of December 1971.

(SEAL)
Attest:

EDWARD M. FLETCHER, JR.　　　　　ROBERT GOTTSCHALK
Attesting Officer　　　　　　　　　Acting Commissioner of Patents